US007061674B2

(12) United States Patent
Mogamiya

(10) Patent No.: US 7,061,674 B2
(45) Date of Patent: Jun. 13, 2006

(54) ELECTRONIC BINOCULARS

(75) Inventor: Makoto Mogamiya, Tokyo (JP)

(73) Assignee: PENTAX Corporation, Tokyo (JP)

( * ) Notice: Subject to any disclaimer, the term of this patent is extended or adjusted under 35 U.S.C. 154(b) by 35 days.

(21) Appl. No.: 10/879,215

(22) Filed: Jun. 30, 2004

(65) Prior Publication Data

US 2005/0007662 A1 Jan. 13, 2005

(30) Foreign Application Priority Data

Jul. 8, 2003 (JP) .......................... P2003-193868

(51) Int. Cl.
*G02B 23/00* (2006.01)

(52) U.S. Cl. ...................................... 359/407; 359/363

(58) Field of Classification Search ........ 359/407–419; 396/492, 432, 100; 382/284; 348/47
See application file for complete search history.

(56) References Cited

U.S. PATENT DOCUMENTS 4,926,247 A * 5/1990 Nagasaki et al. ........... 348/262
5,446,504 A * 8/1995 Wada ......................... 348/645
5,581,399 A * 12/1996 Abe ........................... 359/410
5,648,817 A * 7/1997 Aoki et al. ................. 348/264
5,963,369 A * 10/1999 Steinthal et al. ............ 359/410
6,204,881 B1 * 3/2001 Ikeda et al. ................. 348/362
6,298,198 B1 * 10/2001 Ina et al. ...................... 396/54
6,487,012 B1 * 11/2002 Khoshnevis et al. ........ 359/407
2001/0028498 A1 * 10/2001 Haga et al. ................. 359/407
2003/0128281 A1 * 7/2003 Nihei et al. .............. 348/222.1

OTHER PUBLICATIONS

"Transistor Gijyutsu," Feb. 2003, pp. 148-149, together with an English language translation of the same.

* cited by examiner

*Primary Examiner*—Mark A. Robinson
*Assistant Examiner*—Scott H. Stephens
(74) *Attorney, Agent, or Firm*—Greenblum & Bernstein, P.L.C.

(57) ABSTRACT

Electronic binoculars comprise an imaging unit, an image-signal processing unit, and first and second ocular units. First and second optical images, obtained by the optical system, are converted to first and second electric signals, due to imaging operations of the first and second imaging devices. The imaging operations of the first and second imaging devices are simultaneously started, and ended at different times. The image-signal processing unit superimposes the first and second electric signals to generate a third electric signal. The first and second ocular units indicate object images based on the third electric signal.

9 Claims, 18 Drawing Sheets

62b

| BINARY DATA | | | | The angle $\theta_{30}$ |
|---|---|---|---|---|
| 0 | 0 | 0 | 0 | 15 degrees |
| 1 | 0 | 0 | 0 | 14 degrees |
| 0 | 1 | 0 | 0 | 13 degrees |
| 1 | 1 | 0 | 0 | 12 degrees |
| 0 | 0 | 1 | 0 | 11 degrees |
| 1 | 0 | 1 | 0 | 10 degrees |
| 0 | 1 | 1 | 0 | 9 degrees |
| 1 | 1 | 1 | 0 | 8 degrees |
| 0 | 0 | 0 | 1 | 7 degrees |
| 1 | 0 | 0 | 1 | 6 degrees |
| 0 | 1 | 0 | 1 | 5 degrees |
| 1 | 1 | 0 | 1 | 4 degrees |
| 0 | 0 | 1 | 1 | 3 degrees |
| 1 | 0 | 1 | 1 | 2 degrees |
| 0 | 1 | 1 | 1 | 1 degree |
| 1 | 1 | 1 | 1 | 0 degrees |

ELECTRONIC BINOCULARS

BACKGROUND OF THE INVENTION

1. Field of the Invention

The present invention relates to electronic binoculars, and in particular to electronic binoculars having a control function in which a dynamic range of an imaging device is substantially expanded when photographing an observed image containing parts where a luminance difference is great.

2. Description of the Related Art

Conventionally, electronic binoculars have been proposed that are capable of recording image data in a storage medium, and further, have the advantage of night vision. The electronic binoculars are generally provided with an imaging unit, ocular units, and an image-signal processing unit. The imaging unit has an optical system such as a photographing optical system, and an imaging device for converting an optical image, obtained by the optical system, to an electric signal, which is converted to an image signal by the image-signal processing unit. The image signal is transmitted to the ocular units, so that an image is indicated by the ocular units.

An imaging device, such as a CCD, converts an optical image to an electric signal, which is picked up by the image-signal processing unit at a regular imaging interval, and converted to an image signal.

When an observed image contains parts in which a luminance difference is great, the imaging device needs to have a great dynamic range in order to properly photograph the image. If the imaging time is too short, the amount of light entering the imaging device is not sufficient, so that a loss of detail occurs in dark areas, in which a dark part is not photographed while a bright part is clearly indicated. Conversely, if the imaging time is too long, the amount of light entering the imaging device will exceed the saturation signal amount of a photodiode provided in the imaging device, so that a washing out occurs in bright areas, in which a bright part is saturated while a dark part is clearly indicated.

The loss of detail and washing out effect can be reduced by a dynamic range expansion, in which an electric signal, obtained by using a short imaging time operation, and an electric signal, obtained by using a long imaging time operation, are superimposed, so that the dynamic range is substantially expanded in accordance with the ratio of the short and long imaging times.

Accordingly, in conventional dynamic range expansion, it is necessary to have at least two images which are obtained by using different imaging times, and correspond to a common observed object. Thus, after a first exposure is completed, a second exposure is performed. Therefore, this photographing method is disadvantageous if there is movement of the observed object. Further, it is disadvantageous if there is a camera shake even if the observed object is still. Due to this, it is difficult to apply conventional dynamic range expansion to binoculars having a telephotographic optical system.

SUMMARY OF THE INVENTION

Therefore, an object of the present invention is to provide electronic binoculars that substantially expand the dynamic range of the imaging device, for observing an observed image containing image parts having great luminance differences, without losing dark features or generating washing out.

According to the present invention, electronic binoculars comprise an imaging unit, a superimposing processor, and first and second ocular units.

The imaging unit has an optical system, by which first and second optical images are obtained, and first and second imaging devices, which perform imaging operations to convert the first and second optical images to first and second electric signals. The first and second imaging devices simultaneously start the imaging operations, but end the imaging operations at different times. The superimposing processor superimposes the first and second electric signals to generate a third electric signal. The first and second ocular units indicate the optical images based on the third electric signal.

Further, according to the present invention, electronic binoculars comprise an imaging unit, first and second ocular units, an image-signal processing unit, and a controller.

The imaging unit has first and second imaging devices having first and second imaging fields. First and second optical images corresponding to an observed image, which are obtained through a photographing optical system, are formed on the first and second imaging fields so that the first and second optical images are converted to first and second electric signals. The first and second ocular units indicate the first and second optical images based on the first and second electric signals. The image-signal processing unit converts the first and second electric signals to first and second image signals, and supplies the first and second image signals to the first and second ocular units so that the first and second ocular units indicate the first and second optical images. The controller controls the imaging units, the image-signal processing unit, and the first and second ocular units. The controller controls the imaging unit so that the first and second imaging devices simultaneously start the imaging operations, which continue for a first imaging time and a second imaging time that are different from each other. The controller controls the image-signal processing unit to superimpose the first electric signal, obtained by the imaging operation for the first imaging time, on the second electric signal, obtained by the imaging operation for the second imaging time, to generate a third electric signal, which is converted to a third imaging signal, so that the first and second ocular units indicate an image based on the third image signal.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
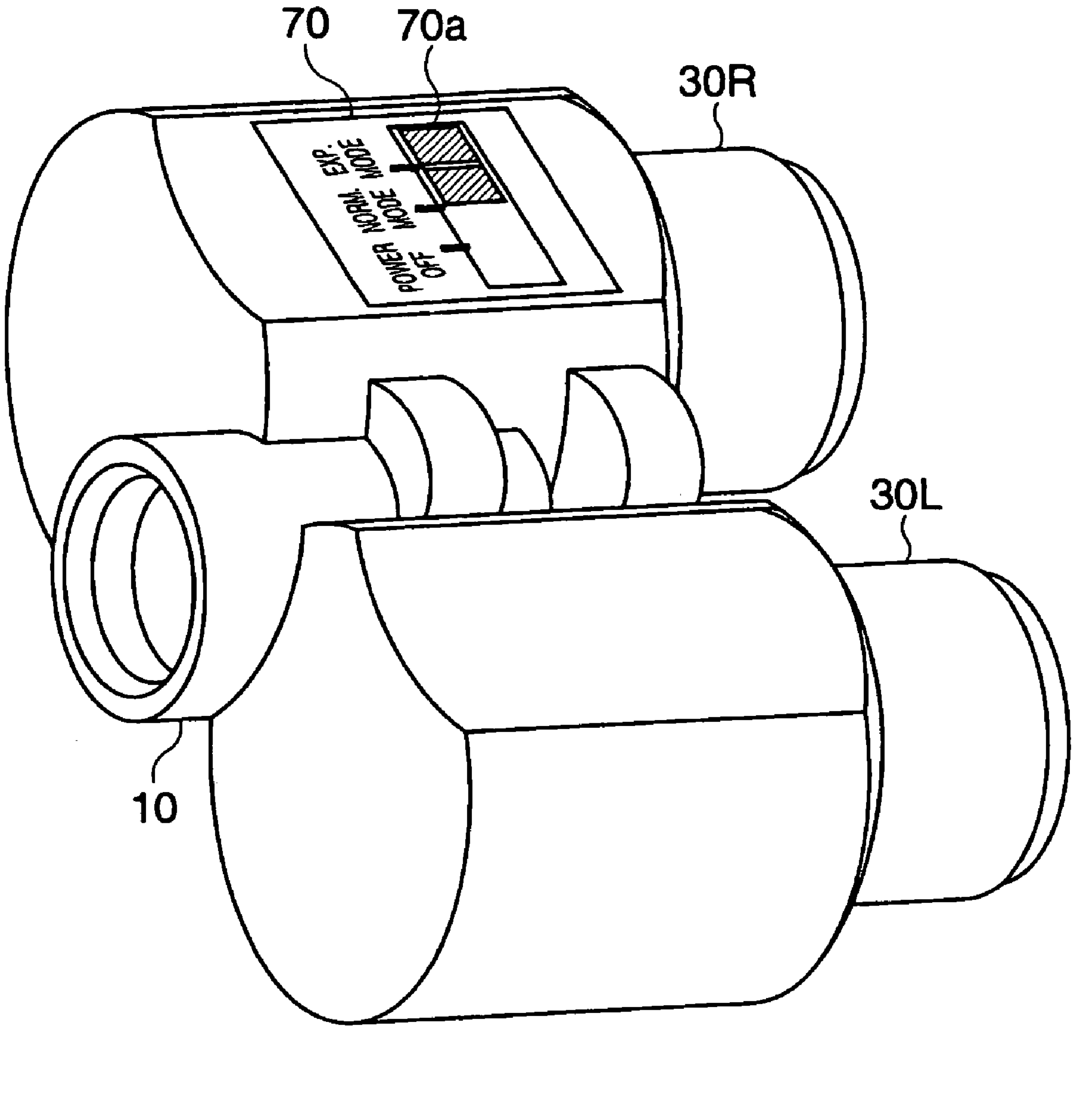
FIG. 1 is a perspective view of electronic binoculars in a first embodiment, viewed from the imaging unit side.

The present invention will be described below with reference to the embodiments shown in the drawings.

Figure 2:
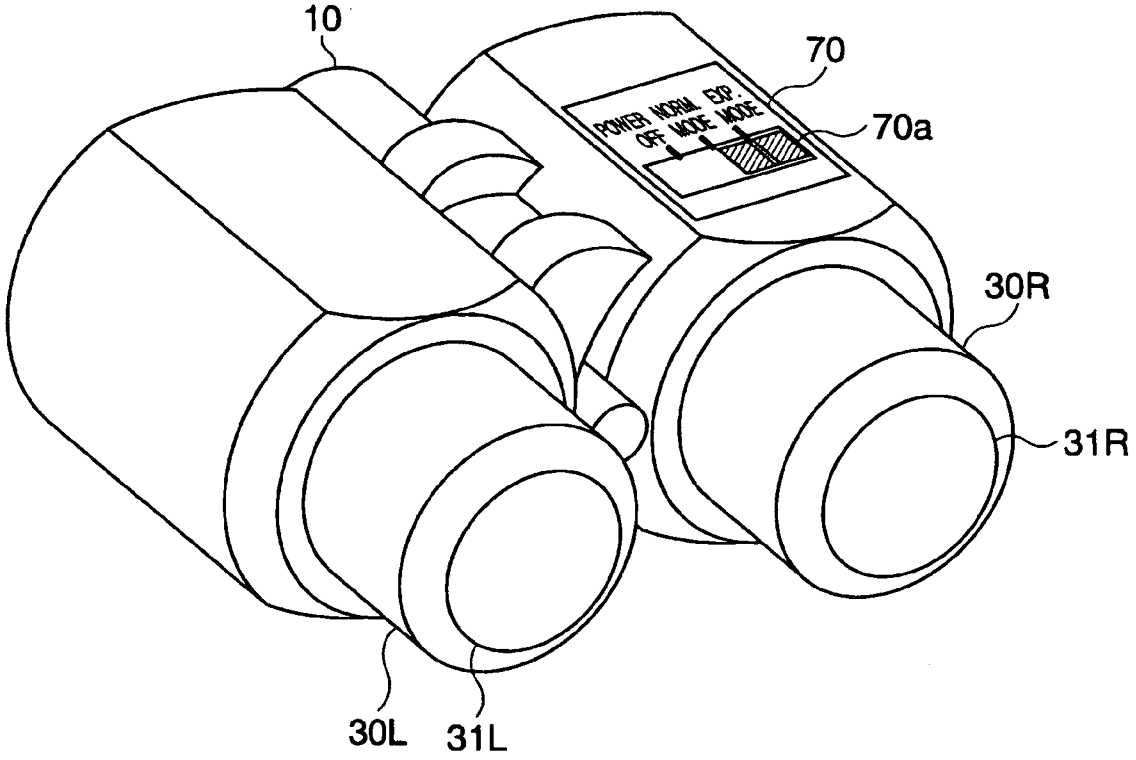
FIG. 2 is a perspective view of the electronic binoculars in the first embodiment viewed from the ocular units side.
Figure 3:
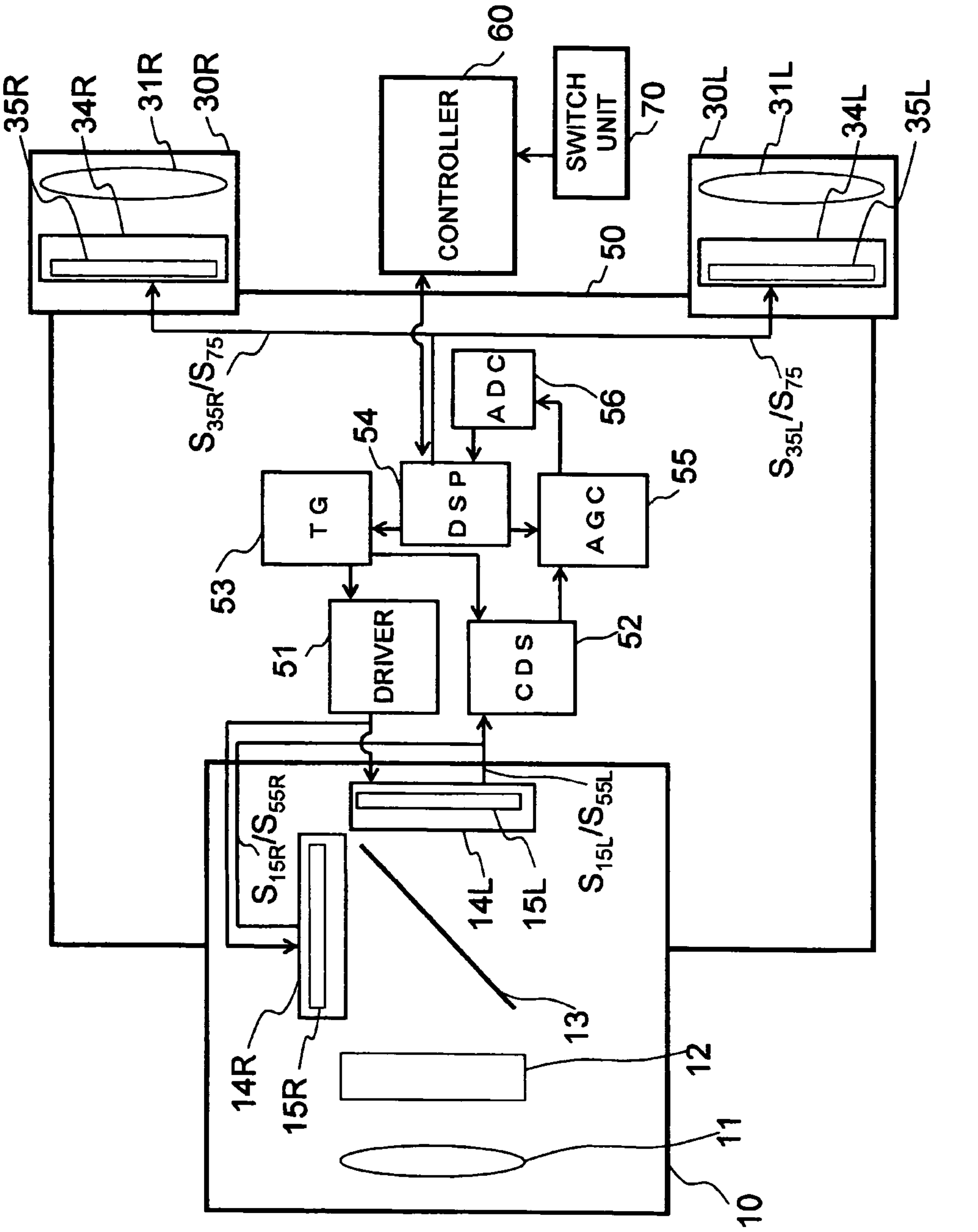
FIG. 3 is a block diagram of the electronic binoculars of the first embodiment.
Figure 4:
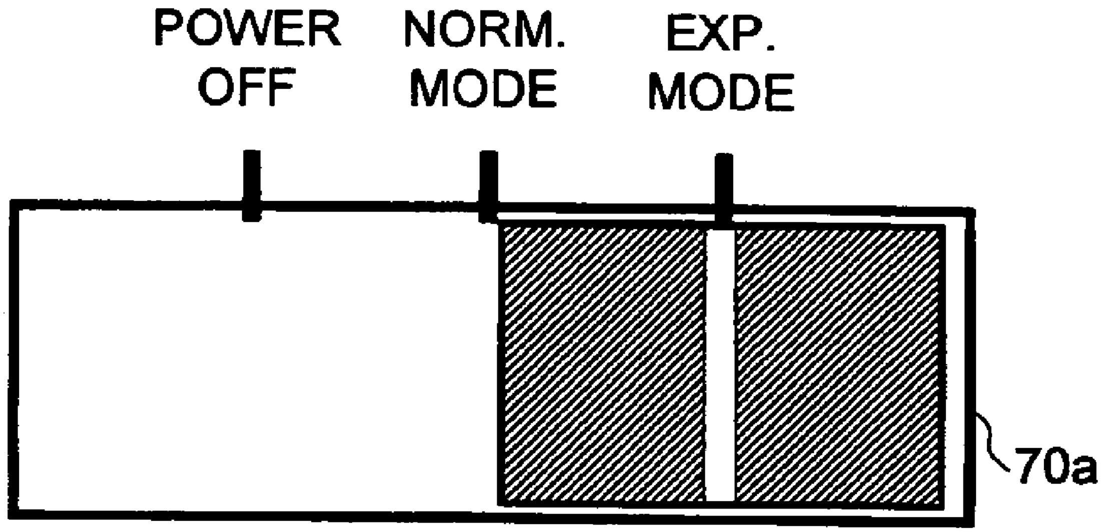
FIG. 4 is a plane view of an operation member of the first embodiment.

As shown in FIGS. 1 to 3, electronic binoculars relating to a first embodiment are provided with an imaging unit 10, right and left ocular units 30R and 30L, an image-signal processing unit 50, a controller 60, and a switch unit 70. Both the right and left ocular units 30R and 30L have similar constructions. The right and left ocular units 30R and 30L are connected to the imaging unit 10 and the image-signal processing unit 50 via a connecting mechanism so that a distance between the ocular optical axes of the respective ocular optical systems is adjusted.

The imaging unit 10 is provided with a single objective lens system or photographing optical system 11, a filter system 12 including an infrared cut-off filter, an optical low-pass filter and the like, an incident light beam splitter 13 such as a half mirror, and imaging devices 14R and 14L, such as CCDs.

The incident light beam splitter 13 splits the incident light beam, passing through the photographing optical system 11 and the filter system 12, into two light beams, which enter the imaging devices 14R and 14L, which perform an imaging operation. Namely, the imaging devices 14R and 14L have imaging fields 15R and 15L, and convert two optical images formed in the imaging fields 15R and 15L to electric signals $S_{15R}$ and $S_{15L}$ with the same imaging time, in a normal mode. The imaging fields 15R and 15L are the same size as each other. Note that the imaging unit 10 may have a focusing mechanism.

The imaging fields 15R and 15L, and the imaging devices 14R and 14L have rectangular shapes. The imaging fields 15R and 15L are contained within and are smaller than the effective image-indicating areas, which are the maximum image-indicating areas of the imaging devices 14R and 14L.

The right ocular unit 30R includes a right image-indicating device 34R, such as an LCD, and a right ocular lens system 31R. The right image-indicating device 34R displays an image corresponding to an image signal fed from the image-signal processing unit 50 on a right image-indicating field 35R. Namely, an observer observes the image displayed on the right image-indicating field 35R through the right ocular lens system 31R. Similarly, the left ocular unit 30L includes a left image-indicating device 34L and a left ocular lens system 31L. The left image-indicating device 34L displays an image on a left image-indicating field 35L.

The right and left image-indicating fields 35R and 35L, and the right and left image-indicating devices 34R and 34L have rectangular shapes. The right and left image-indicating fields 35R and 35L are contained within and are smaller than, effective image-indicating areas which are the right and left maximum image-indicating areas of the right and left image-indicating devices 34R and 34L.

The image-signal processing unit 50 includes an imaging device driver 51, a correlated double sampling circuit (CDS) 52, a timing generator (TG) 53, a digital signal processor (DSP) 54, an auto-gain controller (AGC) 55, and an analog-digital converter (ADC) 56. Namely, the electric signals for an optical image of an object, which are generated in the imaging unit 10, are converted by the image-signal processing unit 50 to image signals which can be displayed, by the right and left ocular units 30R and 30L, and are supplied to them by the image-signal processing unit 50. Further, the image-signal processing unit 50 may include a function that converts the electric signals to different types of image signals (for example, compressed image signals) for recording the image signals in an external storing medium not shown.

The controller 60 controls each unit of the image-signal processing unit 50, and especially, based on a switching condition of the switch unit 70, turns off the electric power source, and switches between a normal mode and a dynamic range expansion mode, described later.

The switch unit 70 has a manually slidable operation member 70*a*, and switch contacts, through which an electric current selectively flows in accordance with the set position of the operation member 70*a*. Thus, the observer can select the normal mode or the dynamic range expansion mode, by operating the operation member 70*a*.

An operation, in which an object image taken through the imaging unit 10, is displayed by the ocular units 30R and 30L in the normal mode, is described below.

Optical object images, obtained through the photographing optical system 11, the filter system 12, and the incident light beam splitter 13, are formed on light receiving areas of the imaging devices 14R and 14L, and photo-electrically converted to electric signals $S_{15R}$ and $S_{15L}$, which are generated by accumulating electric charges for a constant period of time in the imaging devices 14R and 14L. The accumulation period is controlled by the imaging device driver 51.

The electric signals $S_{15R}$ and $S_{15L}$ are processed in the correlated double sampling circuit 52 so that noise components contained in the electric signals $S_{15R}$ and $S_{15L}$ are reduced, and the gains of the electric signals $S_{15R}$ and $S_{15L}$ are controlled in the auto-gain controller 55. The electric signals $S_{15R}$ and $S_{15L}$ are then converted to digital signals. These operations are performed in accordance with a clock pulse which the timing generator 53 outputs to the imaging device driver 51 and the correlated double sampling circuit 52.

The digital image signals are subjected to various kinds of image processing such as gamma correction, in the digital signal processor 54.

The image signals $S_{35R}$ and $S_{35L}$, subjected to the image process in the image-signal processing unit 50, are supplied to the right and left image-indicating devices 34R and 34L provided in the ocular units 30R and 30L, by the image-signal processing unit 50. Thus, images corresponding to the image signals $S_{35R}$ and $S_{35L}$ are indicated in the right and left image-indicating fields 35R and 35L, so that the observer observes the right image through the right ocular lens system 31R with the right eye, and the left image through the left ocular lens system 31L with the left eye.

An operation, in which an object image taken through the imaging unit 10 is displayed by the ocular units 30R and 30L in the dynamic range expansion mode, is described below.

The controller 60 sets the imaging times of the imaging devices 14R and 14L to different values. Namely, the controller 60 controls the imaging unit 10 through the imaging device driver 51, so that the first and second imaging devices 14R and 14L simultaneously start an imaging operation or electric charge accumulation, which continue for first and second imaging times which are different from each other. In other words, the ending times of the electric charge accumulation periods are different in the imaging devices 14R and 14L. Due to this, two imaging signals, in which the electric charge accumulation time (imaging time) is different, are obtained.

In this embodiment, the electric charge accumulation time of the right imaging device 14R is shorter than that of the left imaging device 14L. For example, the right imaging device 14R is 1/250 (sec), and the left imaging device 14L is 1/60 (sec). An imaging time selection switch may be provided so that the values of the imaging times can be arbitrarily changed by the observer. Note that the electric signals obtained in the dynamic range expansion mode are referred to as first and second electric signals $S_{55R}$ and $S_{55L}$, in order to distinguish them from the electric signals $S_{15R}$ and $S_{15L}$ obtained in the normal mode.

Figure 8:
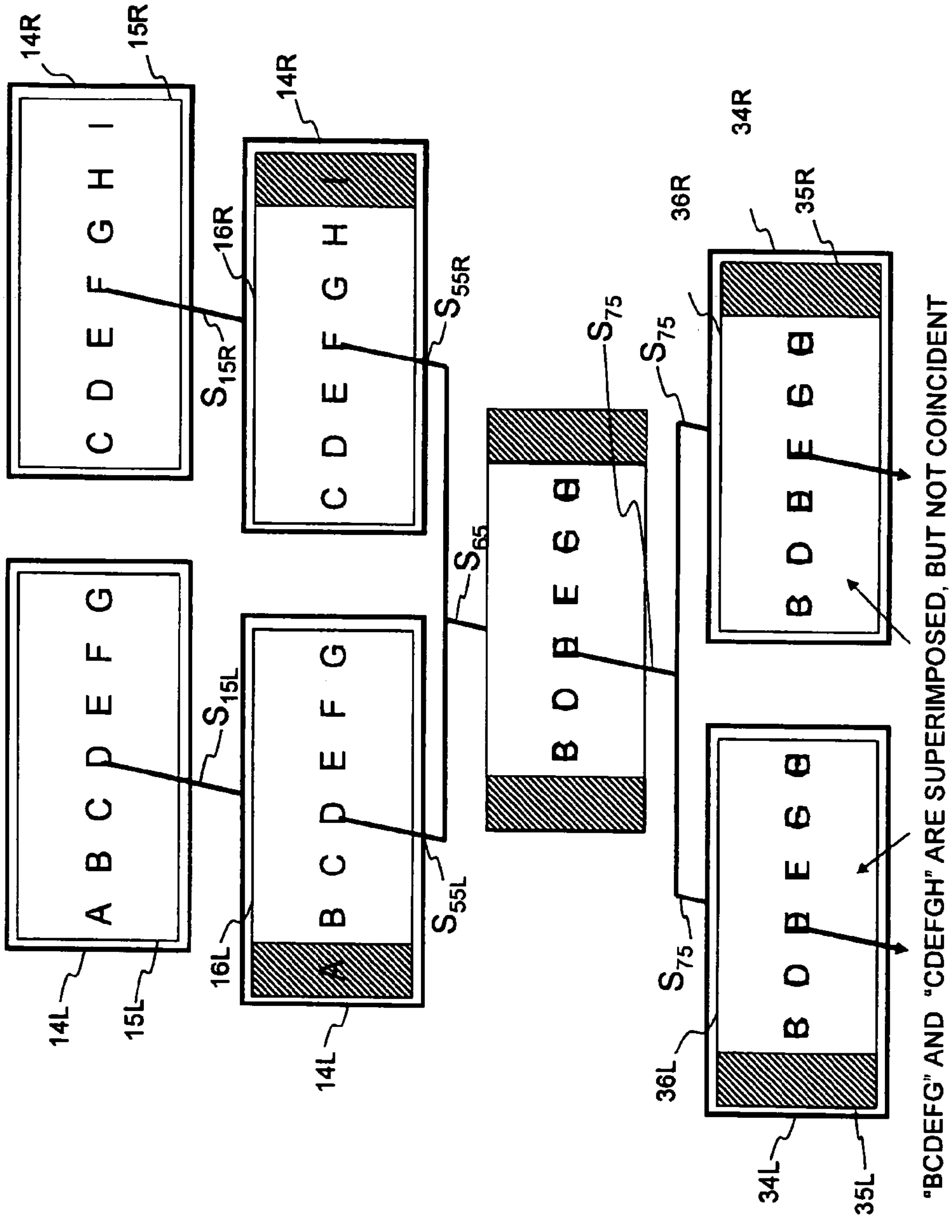
FIG. 8 is a view showing a superimposition of electric signals generated in different imaging fields, in the second embodiment.

The image-signal processing unit 50 superimposes the first electric signal $S_{55R}$, obtained by the imaging operation for the first imaging time, on the second electric signal $S_{55L}$, obtained by the imaging operation for the second imaging time, to generate a third electric signal $S_{65}$ (see FIG. 8). The third electric signal $S_{65}$ is converted, by the image-signal processing unit 50, to a third image signal $S_{75}$, which is supplied to the ocular units 30R and 30L, so that the right and left image-indicating devices 34R and 34L indicate an identical image based on the third image signal $S_{75}$, respectively. Note that a process, in which the electric signal is converted to the image signal, is the same as that for the normal mode.

Thus, in electronic binoculars (being a monocular photographing lens type), electric signals for two different imaging times regarding the common observed image, can be superimposed according to a selection by the observer, so that the dynamic range of the imaging device is substantially expanded by an amount corresponding to a ratio of the long imaging time and the short imaging time. Therefore, the observed image containing parts having great luminance differences can be observed without generating loss of detail in dark areas or washing out in bright areas. Further, since the imaging operations of the imaging devices 14R and 14L start simultaneously and end at different times, a time lag occurring between the image capturing operation in each of the imaging devices is suppressed or minimized, so that the image is hardly affected by camera shake.

Figure 5:
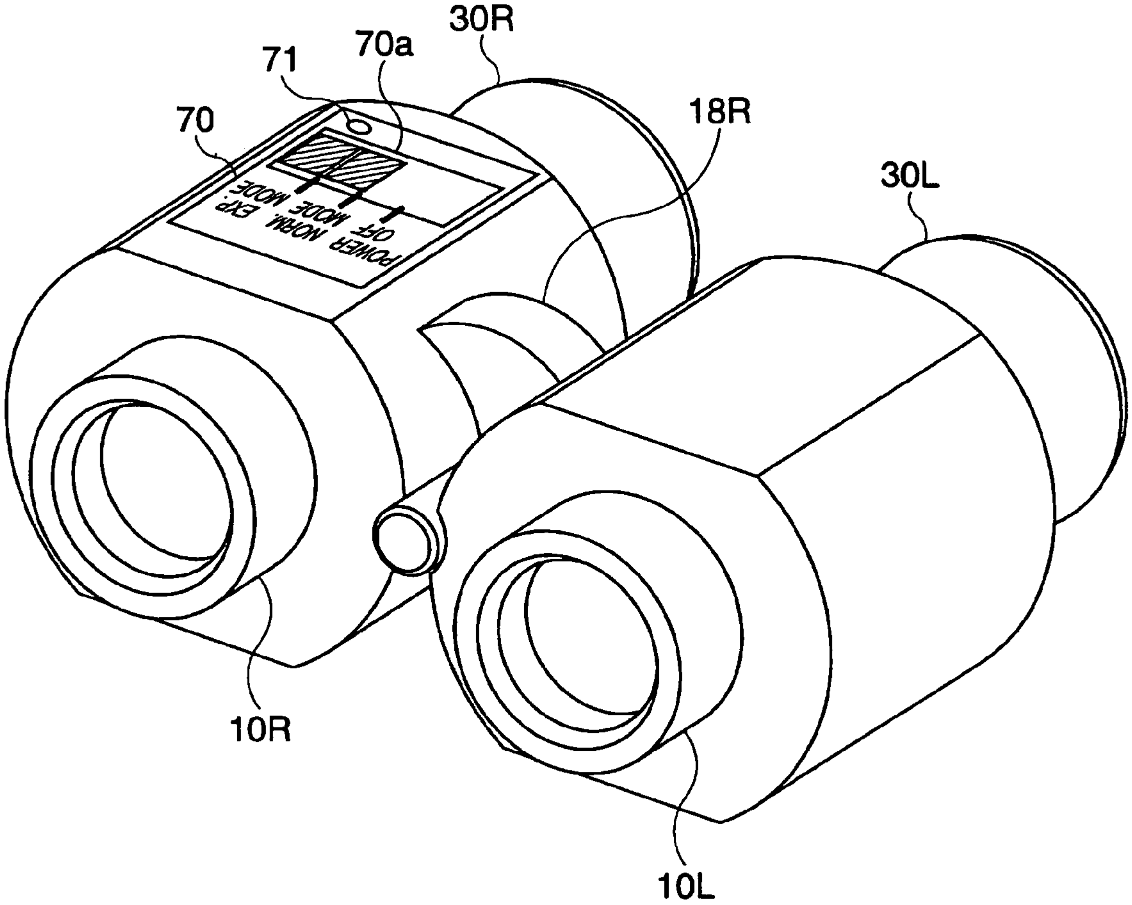
FIG. 5 is a perspective view of electronic binoculars in a second embodiment, viewed from the imaging unit side.
Figure 6:
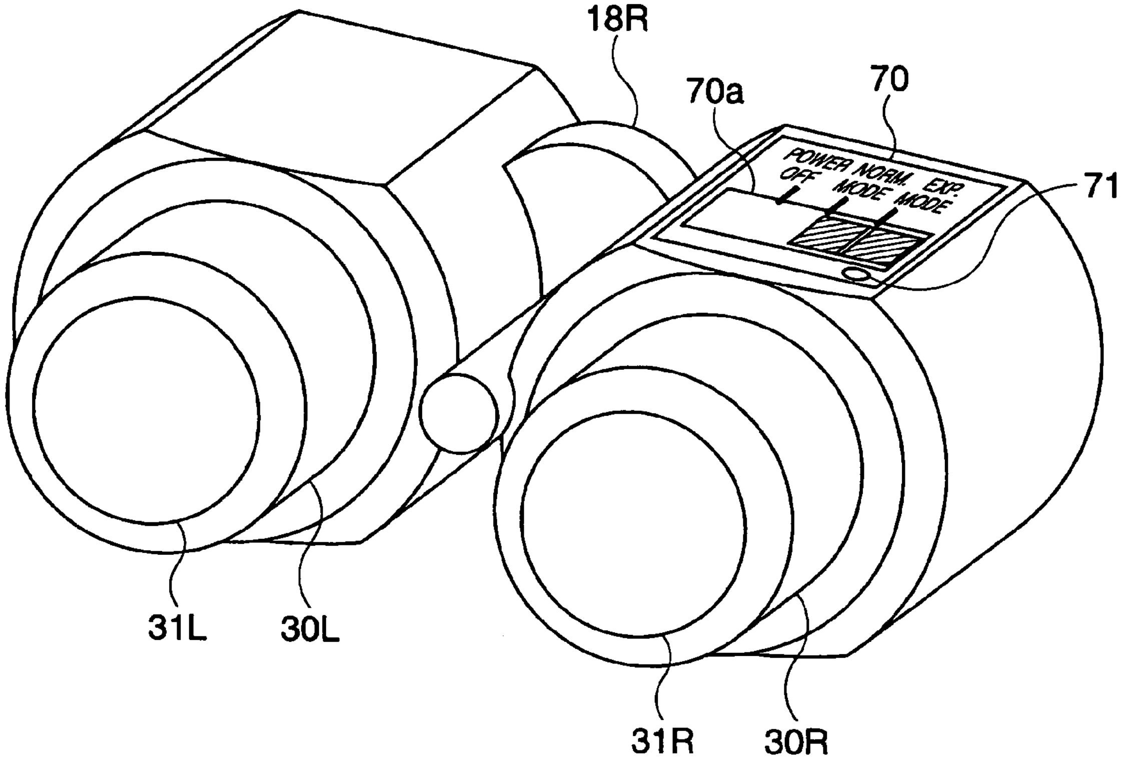
FIG. 6 is a perspective view of the electronic binoculars in the second embodiment viewed from the ocular units side.
Figure 7:
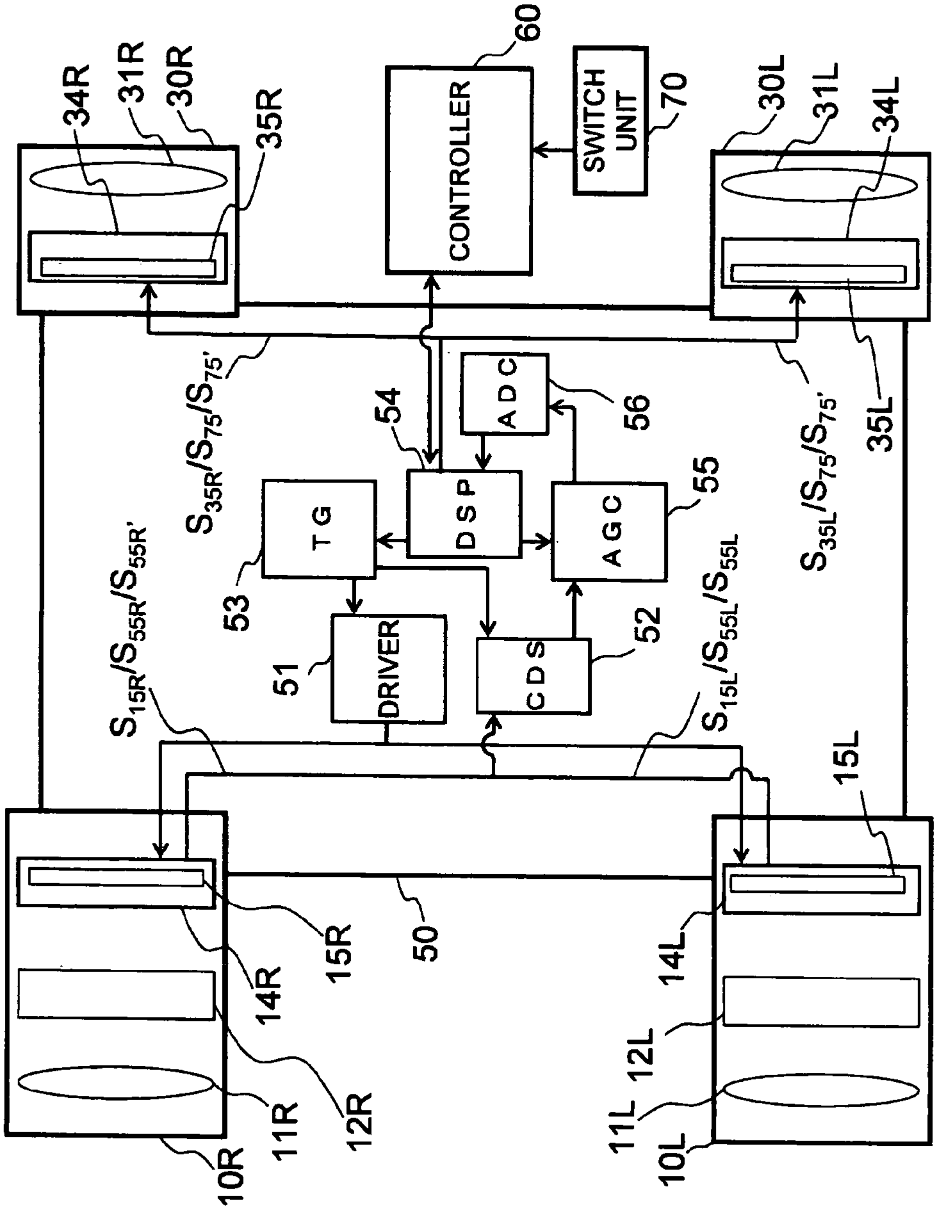
FIG. 7 is a block diagram of the electronic binoculars of the second embodiment.

A second embodiment will be described below. As shown in FIGS. 5 through 7, the second embodiment is a binocular photographing lens type binoculars, while the first embodiment is a monocular photographing lens type binoculars. Thus, in the second embodiment, the electronic binoculars is provided with two imaging units 10R and 10L, each of which has a photographing optical system and an imaging device, but is not provided with an incident light beam splitter. The imaging units 10R and 10L have the same structures, and are connected to the ocular units 30R and 30L, and the image-signal processing unit 50 in such a manner that the distance between the optical axes of the imaging units 1OR and 10L can be adjusted through a connecting mechanism. Only constructions different from those in those in the first embodiment will be described below.

The right imaging unit 10R is provided with a photographing optical system 11R, a filter system 12R including an infrared cut-off filter, an optical low-pass filter and the like, and an imaging device 14R, such as a CCD. In the normal mode, the right imaging device 14R converts an optical image, obtained through the photographing optical system 11R and the filter system 12R and formed on an imaging field 15R, to an electric signal. $S_{15R}$. Similarly, the left imaging unit 10L is provided with a photographing optical system 11L, a filter system 12L, and an imaging device 14L. The imaging device 14L converts an optical image, formed on an imaging field 15L, to an electric signal $S_{15L}$.

Constructions of the controller 60, the switch unit 70, and the operation member 70*a* are the same as those of the first embodiment. The switch unit 70 is further provided with a superimpose adjusting button 71. By depressing the superimpose adjusting button 71, common areas, which are contained in the two imaging fields 15R and 15L, are specified, so that only first and second electric signals $S_{55R}$ and $S_{55L}$ generated by the common areas are picked up and superimposed on each other.

The normal mode, in which an observed image captured by the imaging units 10R and 10L is displayed by each of the ocular units 30R and 30L, is the same as that in the first embodiment. Conversely, an operation of the dynamic range expansion mode is different from that in the first embodiment, as described below.

When the dynamic range expansion mode is selected using the operation member 70*a,* and the superimpose adjusting button 71 is then depressed, the image-signal processing unit 50 superimposes the first electric signal $S_{55R}$ and the second electric signal $S_{55L}$, which are generated in sub imaging fields 16R and 16L (see FIG. 8), which are defined by removing parts, having a constant breadth, from portions which are contained in the imaging fields 15R and 15L and positioned far from each other. Thus, a third electric signal $S_{65}$ (see FIG. 8) is generated by summing the first and second first electric signals $S_{55R}$ and $S_{55L}$, and is converted to a third image signal $S_{75}$, which is supplied to the ocular units 30R and 30L.

The right and left image-indicating devices 34R and 34L indicate images, based on the third image signal $S_{75}$, in sub indicating fields 36R and 36L, which are defined by removing parts, having a constant breadth, from the image-indicating fields 35R and 35L. The removed parts are positioned far from each other (see FIG. 8). Thus, the observer can observe the indicated images, to confirm whether the superimposed image is formed by superimposing two different images or by superimposing two coincident images. Note that the constant breadth is a breadth of the imaging field which is removed by depressing the superimpose adjusting button 71 once, and is predetermined in the image-signal processing unit 50. As the breadth is shorter, a minute adjustment can be possible.

Figure 9:
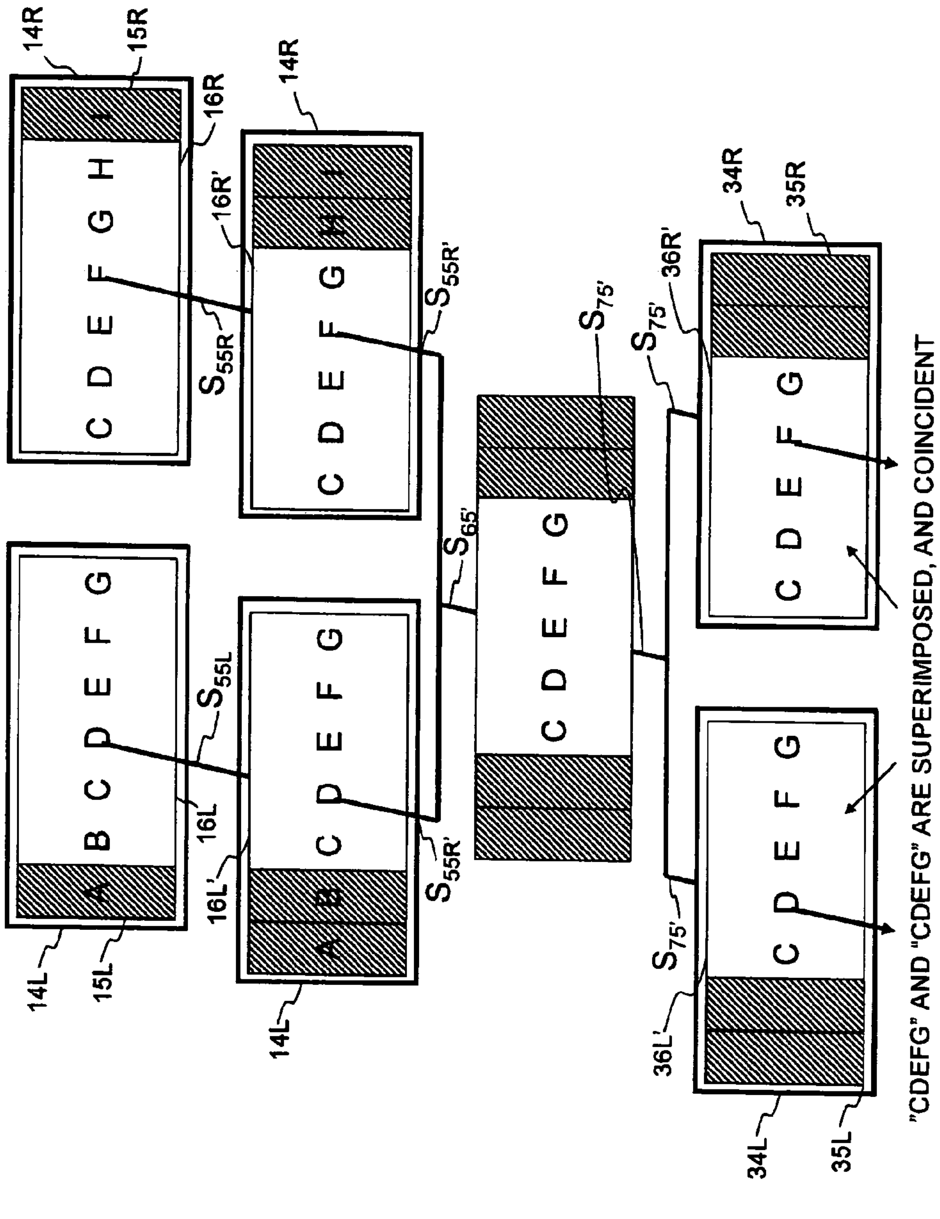
FIG. 9 is a view showing a superimposition of electric signals generated in the different imaging fields, the superimposition being further processed in comparison with that in FIG. 8.

FIGS. 8 and 9 show an example of the superimposing operation of the first and second electric signals $S_{55R}$ and $S_{55L}$ of the imaging fields. In this example, the observed image is a row of characters i.e., "ABCDEFGHI". The right imaging device 14R senses only a part "CDEFGHI" contained in "ABCDEFGHI", and the left imaging device 14L senses only a part "ABCDEFG" contained in "ABCDEF-GHI".

When the dynamic range expansion mode is selected using the operation member 70*a*, and the superimpose adjusting button 71 is depressed once, the image-signal processing unit 50 removes an electric signal component for a strip part "I", which is contained in "CDEFGHI" sensed by the right imaging field 15R. The strip containing "I" is formed on the opposite side of the right imaging field 15R to the left imaging field 15L. By removing the electric signal component of "I", the first electric signal $S_{55R}$ of the sub imaging field 16R corresponding to "CDEFGH" is obtained. Similarly, the image-signal processing unit 50 removes an electric signal component of a strip part "A", which is contained in "ABCDEFG" sensed by the left imaging field 15L and formed on the opposite side of the left imaging field 15L to the right imaging field 15R. By removing the electric signal component of "A", the second electric signal $S_{55L}$ of the sub imaging field 16L corresponding to "BCDEFG" is obtained.

The image-signal processing unit 50 superimposes the first and second electric signals $S^{55R}$ and $S_{55L}$ on each other to obtain a third electric signal $S_{65}$, which is converted to the third image signal $S_{75}$, which is supplied to the ocular units 30R and 30L. Thus, an image, corresponding to the third image signal $S_{75}$, is indicated on each of the sub indicating fields 36R and 36L, which are narrower than the indicating fields 35R and 35L. In FIG. 8, the optical image indicated on each of the sub indicating fields 36R and 36L is a superimposition of an image of "BCDEFG" and an image of "CDEFGH", and is not a superimposition of the coincident images (see FIG. 8).

Therefore, the superimpose adjusting button 71 is depressed once more, so that the image-signal processing unit 50 superimposes, according to a control of the controller 60, new first and second electric signals $S_{55R'}$, and $S_{55L'}$ generated in new sub imaging fields 16R' and 16L'. The sub imaging fields 16R' and 16L' are defined by further removing parts, having a constant breadth, from the imaging fields 15R and 15L. The removed parts are positioned far from each other (see FIG. 9). Thus, a third electric signal $S_{65'}$ is obtained by superimposing the first and second electric signal $S_{55R'}$ and $S_{55L'}$, and is converted to a new third image signal $S_{75'}$, which is supplied to the ocular units 30R and 30L.

The right and left image-indicating devices 34R and 34L indicate images, based on the new third image signal $S_{75'}$, in sub indicating fields 36R' and 36L', which are defined by further removing parts, having a constant breadth, from the image-indicating fields 35R and 35L positioned far from each other (see FIG. 9). Thus, the observer can observe the indicated images, to confirm whether the superimposed image is formed by superimposing two different images or by superimposing two coincident images.

Referring to FIG. 9, when the superimpose adjusting button 71 is depressed once in a state shown in FIG. 8, the image-signal processing unit 50 removes a strip part "H" contained in "CDEFGH" which is sensed by the right imaging field 16R and formed on the opposite side of the right imaging field 16R to the left imaging field 15L. By removing the strip part "H", the new first electric signal $S_{55R'}$ of the sub imaging field 16R' corresponding to "CDEFG" is obtained. Similarly, the image-signal processing unit 50 removes a strip part "B" contained in "BCDEFG" which is sensed by the left imaging field 16L and formed on the opposite side of the left imaging field 16L to the right imaging field 15R. By removing the strip "B", the new second electric signal $S_{55L'}$ of the sub imaging field 16L' corresponding to "CDEFG" is obtained.

The image-signal processing unit 50 superimposes the new first and second electric signals $S_{55R'}$ and $S_{55L'}$ on each other to obtain the new third electric signal $S_{65'}$, which is converted to the new third image signal $S_{75'}$, which is supplied to the ocular units 30R and 30L. Thus, an image, corresponding to the new third image signal $S_{75'}$, is indicated on each of the sub indicating fields 36R' and 36L', which are narrower than the sub indicating fields 36R and 36L. In FIG. 9, optical images indicated on each of the new sub indicating fields 36R' and 36L' are both "CDEFG", which are superimposed on each other, and coincident with each other.

Thus, the observer repeatedly depresses the superimpose adjusting button 71 and checks the two images, until it is judged that the two images are superimposed on each other and coincident with each other. When it is judged that the two images are completely coincident, the operation of the superimpose adjusting button 71 is stopped.

As described above, even when observed images, indicated on the ocular units 30R and 30L, are different and the imaging fields are not coincident in a binocular photographing lens type binoculars, first and second electric signals generated in the duplicated or common imaging fields are superimposed. Further, since the imaging operations of the imaging devices 14R and 14L start simultaneously and end at different times, a time lag occurring in the images captured in each of the imaging devices is minimized, so that the image is hardly affected by a camera shake.

A third embodiment will be described below. The differences from the second embodiment are that the controller 60 has a function, in which coincident imaging fields are automatically calculated from the two imaging fields 15R and 15L, instead of by a manual operation of the superimpose adjusting button 71 by the observer. The different points are described below.

Figure 10:
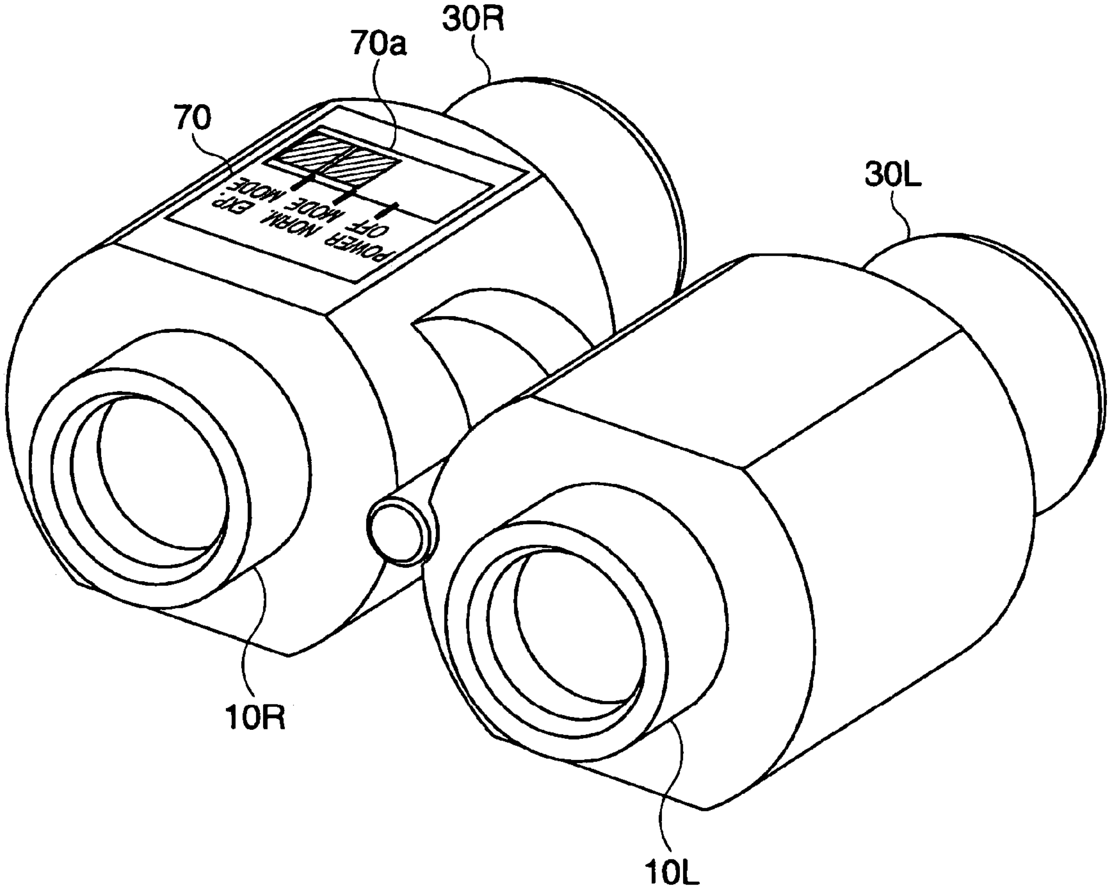
FIG. 10 is a perspective view of electronic binoculars in a third embodiment, viewed from the imaging units side.
Figure 11:
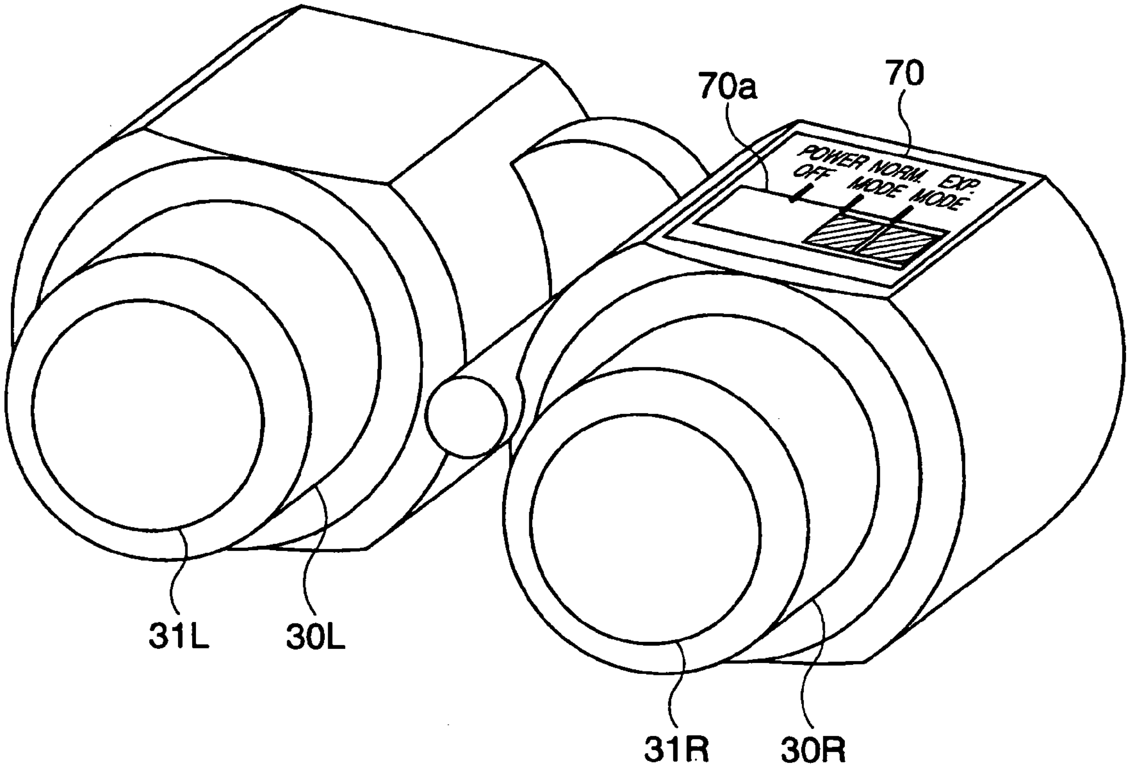
FIG. 11 is a perspective view of the electronic binoculars in the third embodiment viewed from the ocular units side.
Figure 12:
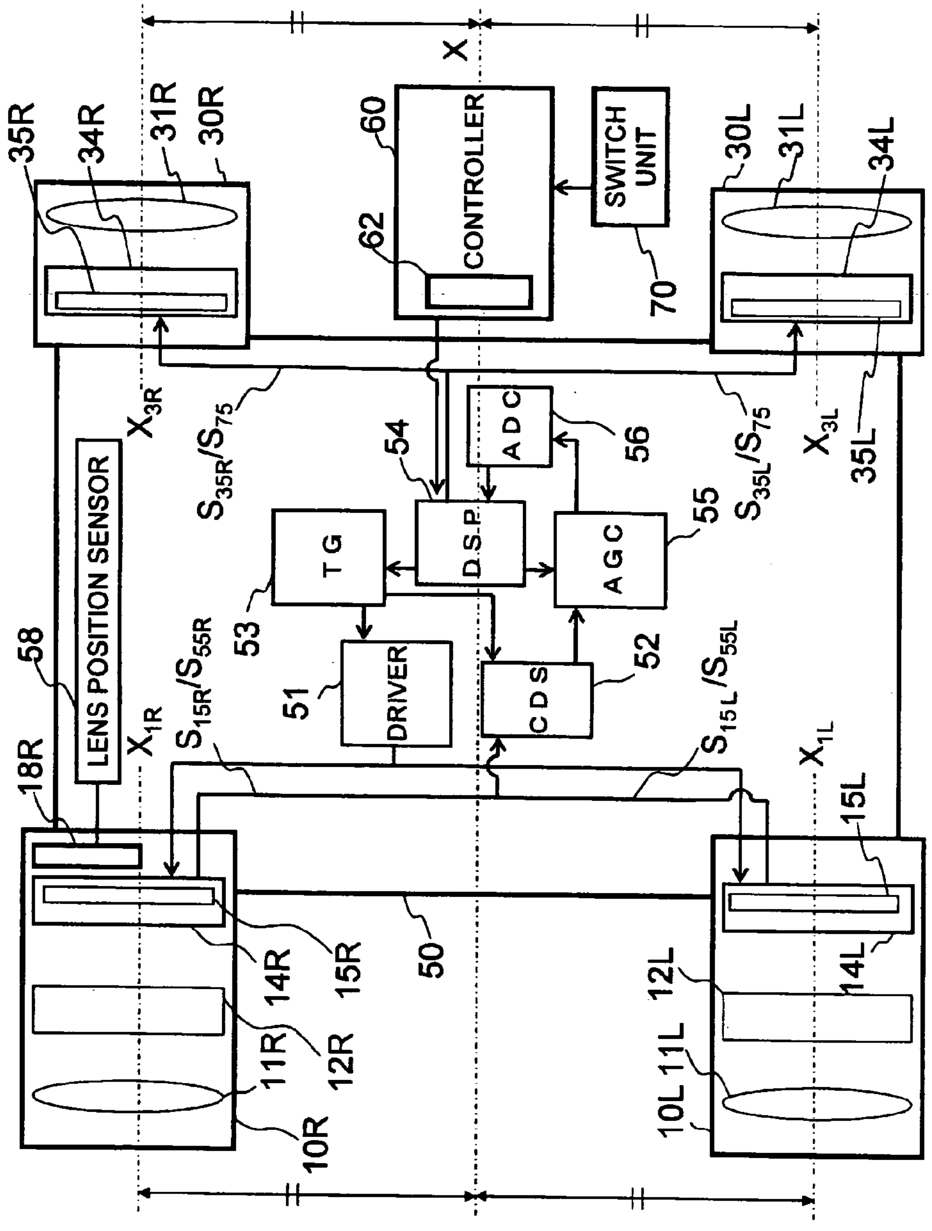
FIG. 12 is a block diagram of the electronic binoculars of the third embodiment.

As shown in FIGS. 10 through 12, electronic binoculars of the third embodiment are provided with a focusing unit 18R for the right imaging unit 10R, so that an observed image is brought into an in-focus state. Further, the electronic binoculars are provided with a lens position sensor 58, which senses a distance that the photographing optical system 11R has moved from a standard position at which the photographing optical system 11R focuses on an object at infinity, so that the object distance D from the electronic binoculars to the observed object, which is in-focus, is sensed.

The ocular units 30R and 30L are rotatable about an axis X positioned at the mid point between the ocular optical axes $X_{3R}$ and $X_{3L}$. Due to this rotation, an angle formed by a first plane, containing the right ocular optical axis $X_{3R}$ and the axis X, and a second plane, containing the left ocular optical axis $X_{3L}$ and the axis X, is changed, so that the distance between the right and left ocular optical axes $X_{3R}$ and $X_{3L}$ is changed, to adjust an interpupillary distance. Similarly, the imaging units 10R and 10L are rotatable about the axis X, which is positioned at the mid point between the imaging optical axes $X_{1R}$ and $X_{1L}$.

Figure 13:
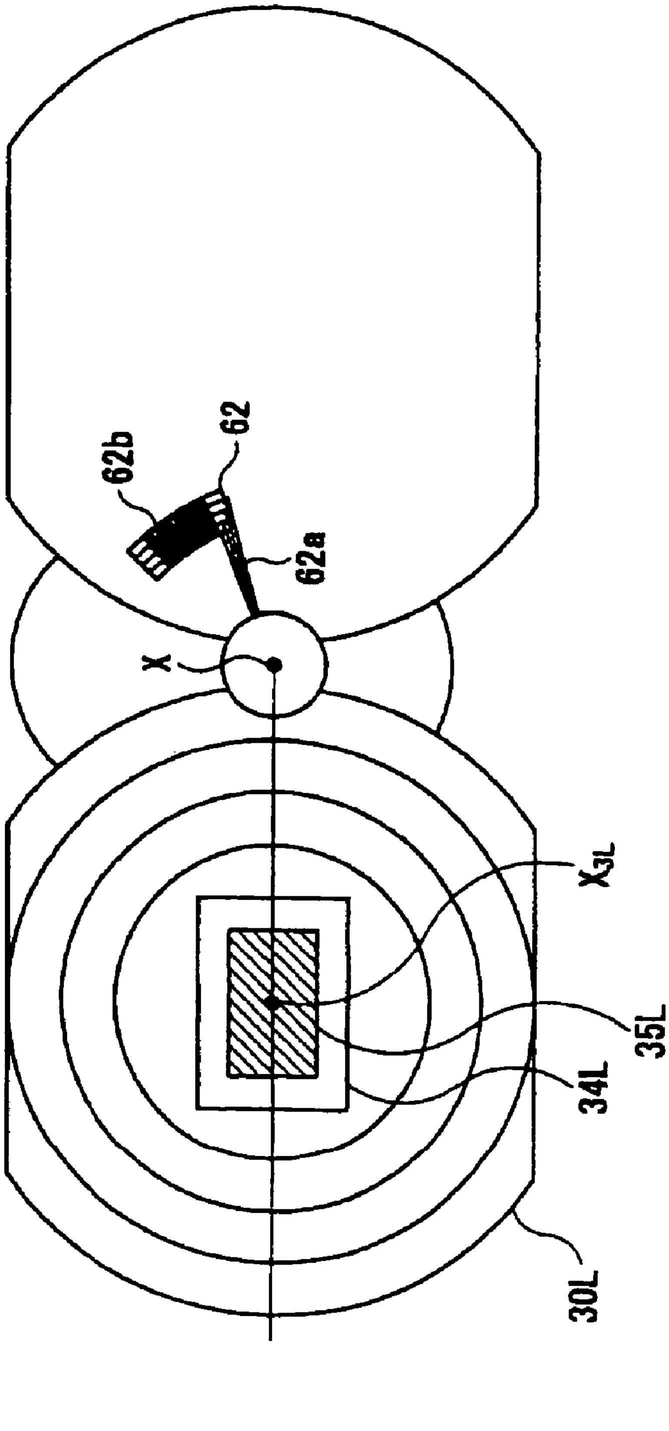
FIG. 13 is a view of the ocular units, and a rotating angle sensor, before the adjustment of an interpupillary distance, viewed from the ocular units side, in the third embodiment.
Figure 14:
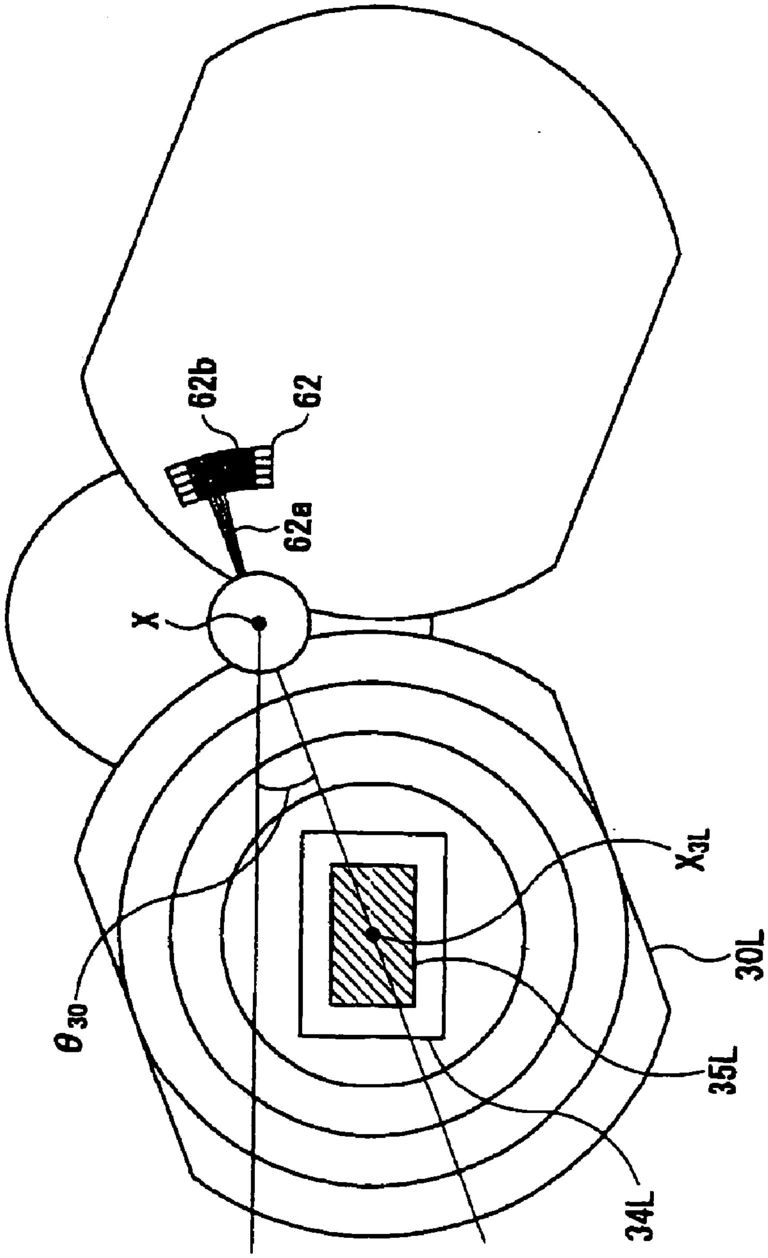
FIG. 14 is a view of the ocular units, and the rotating angle sensor, after the adjustment of an interpupillary distance, viewed from the ocular units side, in the third embodiment.

The controller 60 is provided with a rotating angle sensor 62, to sense a rotating angle $\theta_{30}$, by which each of the ocular units 30R and 30L is rotated about the axis X in order to adjust the interpupillary distance. The rotating angle sensor 62 is provided with a brush 62*a* and a code board 62*b*. Namely, when the left ocular unit 30L is rotated, binary data or digital data is output in accordance with a contact position at which the brush 62*a* comes in contact with the code board 62*b*, so that the rotating angle $\theta_{30}$ is sensed (see FIGS. 13 and 14).

Figure 15:
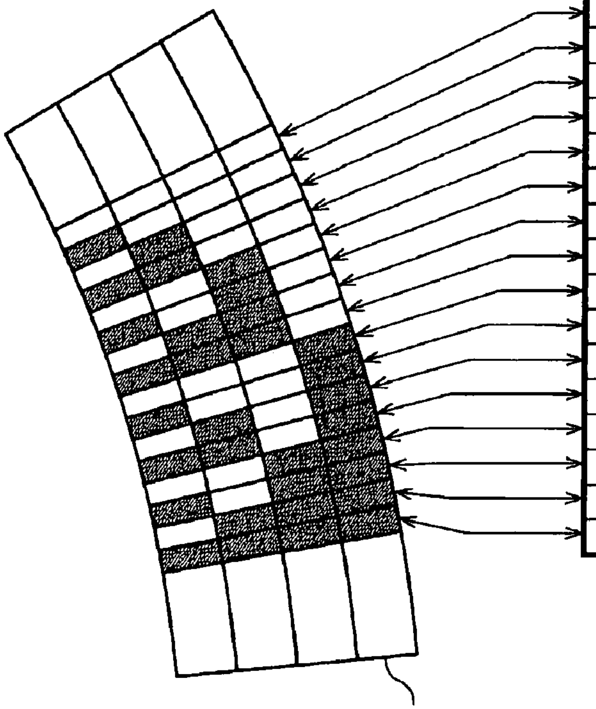
FIG. 15 is a substitution table, in which the relationship between binary data of the point of contact of a brush and a code board, and the rotating angle, is given in the third embodiment.

The relationship between the binary data and the rotating angle $\theta_{30}$ is stored in a substitution table shown in FIG. 15 provided in the controller 60, so that the rotating angle $\theta_{30}$ is obtained using the table. For example, when the brush 62*a* comes in contact with the code board 62*b* at a point corresponding to the binary data "1", "1", "0", and "0", the rotating angle $\theta_{30}$ is 12 degrees. In this embodiment, the ocular units 30R and 30L are rotated about the axis X positioned at the mid point between the right and left ocular optical axes $X_{3R}$ and $X_{3L}$, and therefore, the rotating angle of the right ocular unit 30R is also $\theta_{30}$ and the rotating direction is opposite to that of the left ocular unit 30L. Thus, the rotating angle of the right ocular unit 30R need not be detected.

Further, an angle of real field of view θ of the binoculars, and the sizes of the imaging fields are stored in a memory provided in the controller 60.

The overlapping imaging areas contained in the two imaging fields 15R and 15L, i.e., the imaging area obtained after removing the non-overlapping imaging areas peculiar to each imaging field 15R or 15L, is obtained based on the object distance D, the angle of real field of view θ, inherent to the binoculars, and the sizes of the imaging fields, inherent to the binoculars, and the interpupillary distance.

Figure 16:
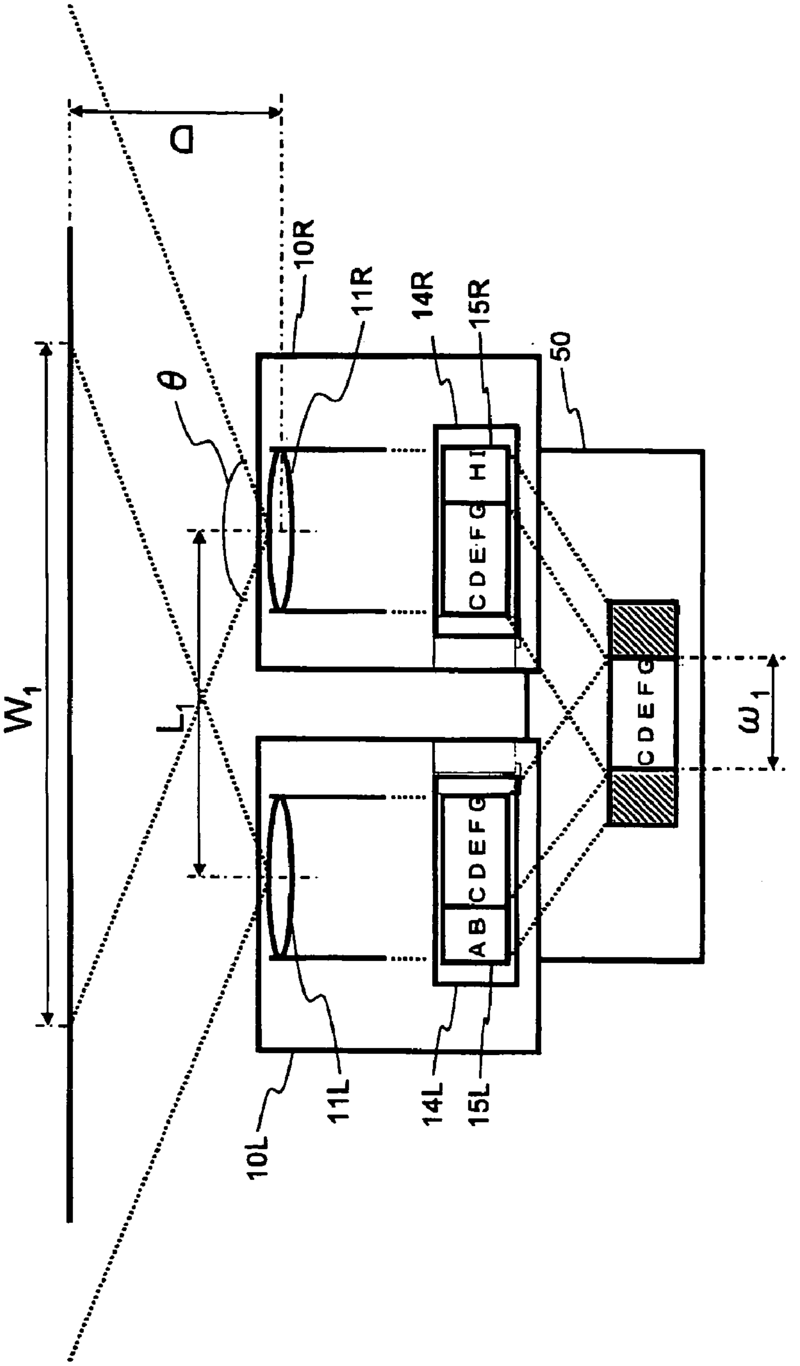
FIG. 16 is a view showing the breadth of duplicated imaging fields when the interpupillary distance is $L_1$.

The method for obtaining the breadth will be described below with reference to FIGS. 16 and 17, which show optical images indicated in a plane view of the electronic binoculars, in which the ocular units 15R and 15L are omitted.

It is supposed that the observed object is located at a distance D from the binoculars, and comprises the set of characters "ABCDEFGHI". When the interpupillary distance $L_1$ is relatively wide as shown in FIG. 16 in comparison with FIG. 17, the right imaging device 14R senses only "CDEFGHI" from the character set "ABCDEFGHI". Further, the left imaging device 14L senses only "ABCDEFG" from the character set "ABCDEFGHI". Therefore, the range of the overlapping image, sensed in the imaging fields 15R and 15L, is indicated by "CDEFGH", i.e., the length $\omega_1$.

Figure 17:
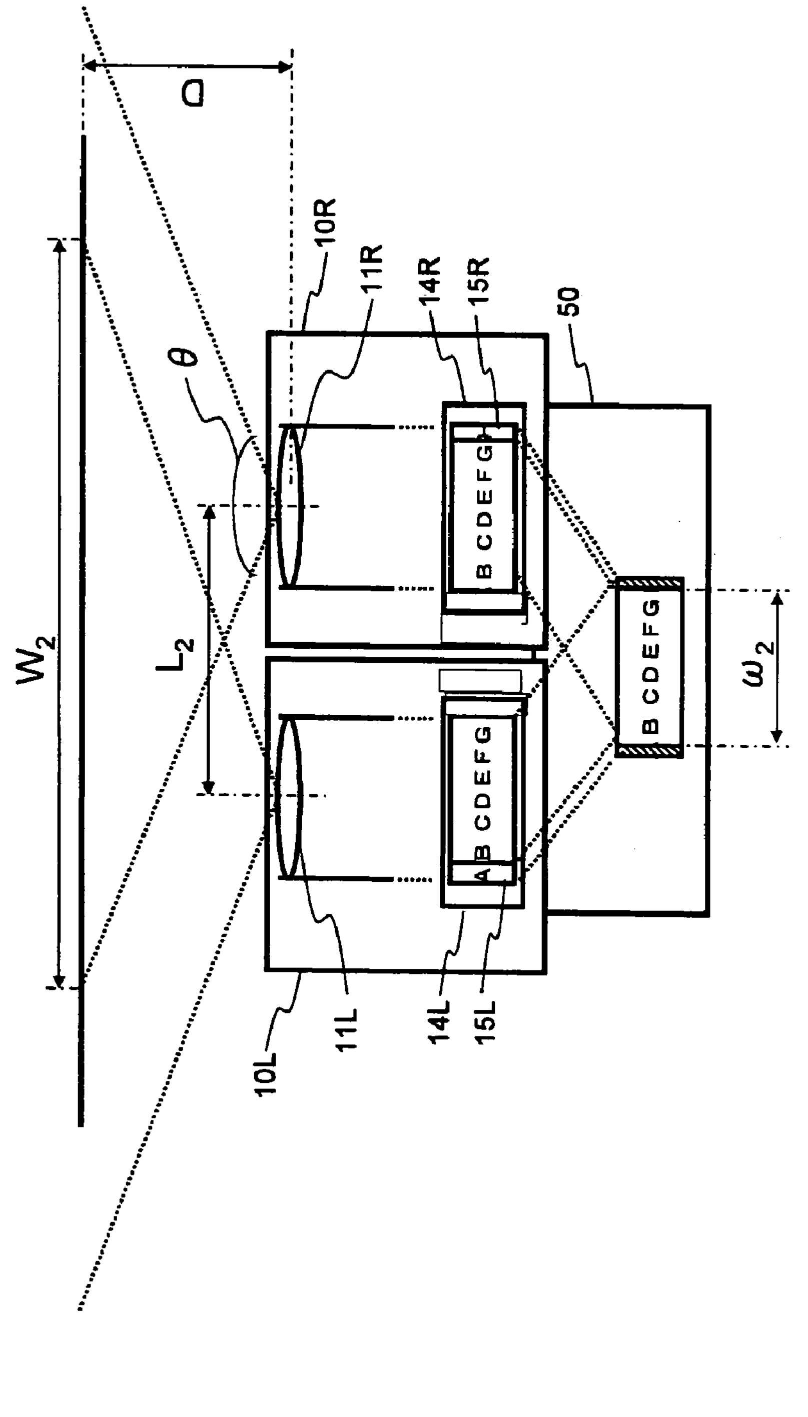
FIG. 17 is a view showing the breadth of the duplicated imaging fields when the interpupillary distance is $L_2$.

On the other hand, when the interpupillary distance $L_2$ is narrower than the interpupillary distance $L_1$, as shown in FIG. 17, the right imaging device 14R senses only "BCDEFGH" from the character set "ABCDEFGHI". Since the interpupillary distance $L_2$ is narrower than the interpupillary distance $L_1$, "I",sensed by the imaging field 15R for the interpupillary distance $L_1$, is not sensed for the interpupillary distance $L_2$. The left imaging device 14L senses only "ABCDEFG" from the character set "ABCDEFGHI". Therefore, the range of the overlapping image, sensed by the imaging fields 15R and 15L, is "BCDEFGH", i.e., the length $\omega_2$.

Regarding these conditions, $\omega_2$ is wider than $\omega_1$, while the changed item is only the interpupillary distance. Namely, the object distance D, the angle of real field of view θ, and the sizes of the imaging fields, are not changed.

The object distance D, which is an important parameter necessary for calculating the length of the overlapping imaging areas, is obtained by a known procedure, such as the contrast detecting method, when the photographing optical system 11 is set to an in-focus condition.

The interpupillary distance, which is an important parameter necessary for calculating the length of common imaging areas, is obtained by detecting the interpupillary distance, using a mechanism for sensing the distance between the optical axes of the imaging units 10R and 10L. Namely, a rotating angle is sensed by the rotating angle sensor 62, so that the distance between the ocular optical axes $X_{3R}$ and $X_{3L}$ is calculated based on the relationship between the rotating angle and the rotating radii of the ocular units 30R and 30L.

The controller 60 obtains the length of the overlapping imaging areas based on the object distance D, the interpupillary distance, the angle of real field of view θ, and the sizes of the imaging fields 15R and 15L. The image-signal processing unit 50 selects sub imaging fields 16R and 16L, which are contained in the imaging fields 15R and 15L, and are close to each other. Further, the sub imaging fields 16R and 16L have the same length for imaging the overlapping imaging areas. The image-signal processing unit 50 then superimposes electric signals, i.e., the first and second electric signals $S_{55R}$ and $S_{55L}$, on each other, to generate the third electric signal $S_{75}$. The third electric signal $S_{75}$ is converted, by the image-signal processing unit 50, to the third image signal $S_{75}$, which is supplied to-the ocular units 30R and 30L, so that the right and left image-indicating devices 34R and 34L indicate the image based on the third image signal $S_{75}$, respectively, in the sub indicating fields 36R and 36L. The sub indicating fields 36R and 36L are contained in the image-indicating fields 35R and 35L, and are close to each other. Further, they have the same breadth and represent the overlapping areas.

Figure 18:
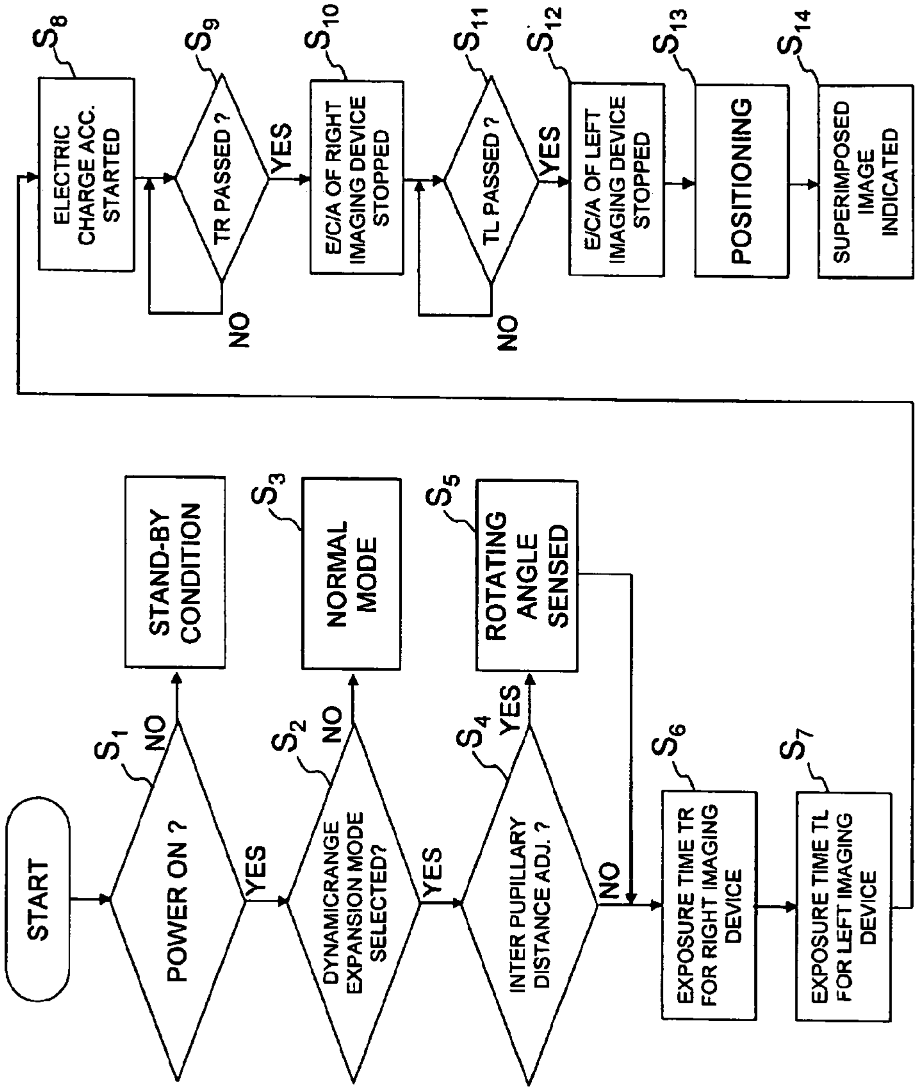
FIG. 18 is a flowchart showing the superimposition of images captured by the right and left imaging devices, in the third embodiment.

With reference to FIG. 18, an operation of the third embodiment will be described below.

In Step S1, it is determined whether the electric power of the electronic binoculars is turned ON. When the electric power is turned OFF, a stand-by condition is set. Conversely, when the electric power is turned ON, Step S2 is executed, in which it is determined whether the dynamic range expansion mode is selected. When the dynamic range expansion mode is not selected, Step S3 is executed, in which the normal mode is set, so that image signals, obtained by the right and left imaging units 10R and 10L, are supplied to the right and left ocular units 30R and 30L.

Conversely, when the dynamic range expansion mode is selected, Step S4 is executed, in which it is determined whether an interpupillary distance adjustment has been performed. When the interpupillary distance adjustment has been performed, Step S5 is executed, in which a rotating angle is sensed by the rotating angle sensor 62. Then, in Step S6, an exposure time TR of the right imaging device 14R is set to a relatively short time so that a part of the image having a high luminance is clearly recorded or photographed under an optimum condition. In Step S7, an exposure time TL of the left imaging device 14L is set to a relatively short time so that a part of the image having a high luminance is clearly recorded or photographed under an optimum condition.

In Step S8, electric charge accumulation is simultaneously started in the imaging devices 14R and 14L. Then, it is determined in Step S9 whether the exposure time TR for the right imaging device 14R has passed since the start of the electric charge accumulation. When the exposure time TR has not passed, Step S9 is repeatedly carried out. When the exposure time TR has passed, Step S10 is executed, in which the electric charge accumulation of the right imaging device 14R is stopped, and the accumulated electric charge is read out. Then, it is determined in Step S11 whether the exposure time TL for the right imaging device 14L has passed since the start of the electric charge accumulation. When the exposure time TL has not passed, Step S11 is repeatedly carried out. When the exposure time TL has passed, Step S12 is executed, in which the electric charge accumulation of the left imaging device 14L is stopped, and the accumulated electric charge is read out.

In Step S13, a positioning operation is performed, so that parts, which are contained in the images captured through the imaging devices 10R and 10L, and that can be superimposed, are designated or specified. In the positioning operation, a calculation result, based on the rotating angle $\theta_{30}$ sensed in Step S5, the object distance D, and the angle of real field of view θ, is used. When the positioning operation is completed, Step S14 is executed, in which the superimposed image is indicated by each of the ocular units 30R and 30L. Thus, an identical image is indicated by the ocular units 30R and 30L.

Thus, due to the selection by the observer, in electronic binoculars of a binocular photographing lens type, the length of the overlapping imaging areas is automatically calculated, so that the first and second electric signals of the overlapping imaging areas can be superimposed. Further, since the imaging operations of the imaging devices 14R and 14L are simultaneously started and end at different times, a time lag occurring between the image capturing operation in each of the imaging devices is suppressed or minimized, so that the image is hardly affected by a camera shake.

In the third embodiment, a rotation axis X for performing the interpupillary distance adjustment is coincident with the mid point between the ocular optical axes $X_{3R}$ and $X_{3L}$, and is coincident with the mid point between imaging optical axes $X_{1R}$ and $X_{1L}$. However, the rotation axis of each of the ocular units and the imaging units may be different, if the rotating angles of the ocular units and the imaging units are sensed, for calculating the value of the interpupillary distance.

In each of the embodiments, the imaging fields 15R and 15L have the same sizes, but they may have different sizes. In this case, the imaging field, having a smaller area, should be set to the maximum range, within which the overlapping imaging areas can be defined, in such a manner that the first and second electric signals $S_{55R}$ and $S_{55L}$ are obtained.

Further, in each of the embodiments, the electric signals are superimposed. However, the image signals, which are used for the ocular units, can be superimposed instead. Namely, the result of superimposing the electric signal before it has been converted to an image signal, or after it has been converted to an image signal, is not greatly different.

The present disclosure relates to subject matter contained in Japanese Patent Application No. 2003-193868 (filed on Jul. 8, 2003), which is expressly incorporated herein by reference, in its entirety.

The invention claimed is:

1. Electronic binoculars, comprising:

an imaging unit that has an optical system, by which first and second optical images are obtained, and first and second imaging devices, which perform imaging operations to convert said first and second optical images to first and second electric signals, said first and second imaging devices simultaneously starting said imaging operations and ending said imaging operations at different times;

a superimposing processor that superimposes said first and second electric signals to generate a third electric signal; and first and second ocular units that indicate images based on said third electric signal.

2. The binoculars according to claim 1, wherein said optical system comprises a single objective lens system, and an incident light beam splitter that splits a light beam passing through said objective lens system to form said first and second optical images.

3. The binoculars according to claim 1, wherein said optical system comprises first and second objective lens systems that form said first and second optical images.

4. The binoculars according to claim 1, wherein said third electric signal is generated by superimposing a fourth electric signal which is a first part of said first electric signal, and a fifth electric signal which is a second part of said second electric signal, said first and second parts corresponding to a common image of said first and second optical images.

5. Electronic binoculars, comprising:

an imaging unit that has first and second imaging devices having first and second imaging fields, first and second optical images corresponding to an observed image, which are obtained through a photographing optical system, being formed in said first and second imaging fields so that said first and second optical images are converted to first and second electric signals;

first and second ocular units that can indicate said first and second optical images based on said first and second electric signals;

an image-signal processing unit that converts said first and second electric signals to first and second image signals, and supplies said first and second image signals to said first and second ocular units so that said first and second ocular units indicate said first and second optical images; and a controller that controls said imaging devices, said image-signal processing unit, and said first and second ocular units said controller controlling said imaging unit so that said first and second imaging devices simultaneously start imaging operations, which continue for first and second imaging times which are different from each other, said controller controlling said image-signal processing unit to superimpose said first electric signal, obtained by said imaging operation for said first imaging time, and said second electric signal, obtained by said imaging operation for said second imaging time, to generate a third electric signal, which is converted to a third imaging signal, so that said first and second ocular units indicate an image based on said third image signal.

6. The binoculars according to claim 5, further comprising a manually operated operating unit, said first and second imaging times and said first and second imaging fields being controlled in accordance with the operating conditions of said operating unit.

7. The binoculars according to claim 5, wherein said photographing optical system comprises a first photographing optical system for obtaining said first optical image, and a second photographing optical system for obtaining said second optical image.

8. The binoculars according to claim 5, wherein said third electric signal is obtained by converting overlapping optical images which are contained in said first and second optical images, and are commonly formed in said first and second imaging fields, to fourth and fifth electric signals and superimposing said fourth and fifth electric signals on each other.

9. The binoculars according to claim 8, further comprising:

a focusing unit provided for bringing said photographing optical system into an in-focus condition;

a distance measurement processor that senses an object distance from said binoculars to the observed object in said in-focus condition;

an ocular unit rotating mechanism that rotates said first and second ocular units about an axis parallel to the ocular optical axes;

a rotating angle sensor that senses rotating angles of said first and second ocular units; and an overlapping field obtaining processor that obtains overlapping fields contained in said first and second imaging fields, based on said object distance and said rotating angle.

* * * * *